United States Patent
Acker et al.

(10) Patent No.: US 6,592,144 B2
(45) Date of Patent: Jul. 15, 2003

(54) ASSEMBLY CONSISTING OF A BACKREST AND AN AIRBAG MODULE

(75) Inventors: Dominique Acker, Alfdorf (DE); Andreas Loos, Eislingen (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 10/046,014

(22) Filed: Oct. 19, 2001

(65) Prior Publication Data

US 2002/0060447 A1 May 23, 2002

(30) Foreign Application Priority Data

Oct. 19, 2000 (DE) .......................... 200 17 919

(51) Int. Cl.⁷ .............................................. B60R 21/22
(52) U.S. Cl. .................................. 280/730.2; 280/728.3
(58) Field of Search ......................... 280/730.2, 730.1, 280/728.3

(56) References Cited

U.S. PATENT DOCUMENTS

| | | | |
|---|---|---|---|
| 5,799,971 A | * | 9/1998 | Asada .................... 280/730.2 |
| 5,988,674 A | | 11/1999 | Kimura et al. |
| 6,073,961 A | * | 6/2000 | Bailey et al. ............ 280/730.2 |
| 6,179,324 B1 | | 1/2001 | White, Jr. et al. |

FOREIGN PATENT DOCUMENTS

| | | |
|---|---|---|
| DE | 29510608 U1 | 10/1995 |
| DE | 19622319 A1 | 12/1996 |
| DE | 19727746 A1 | 1/1999 |
| DE | 29915821 U1 | 3/2000 |
| DE | 19915831 A1 | 10/2000 |
| EP | 0644088 A2 | 3/1995 |
| FR | 2760701 A1 | 9/1998 |

* cited by examiner

Primary Examiner—Eric Culbreth
(74) Attorney, Agent, or Firm—Tarolli, Sundheim, Covell & Tummino L.L.P.

(57) ABSTRACT

An assembly consists of a backrest and an airbag module, the backrest having a frame, a padding and a covering part. The airbag module has an ejection channel that is attached to the frame. The covering part is designed so as to be rigid whereas the padding in an area of transition to the covering part is configured so as to be so pliant that by deformation of the padding a gap is produced between the covering part and the padding, for the airbag to come out of the backrest.

8 Claims, 3 Drawing Sheets

ASSEMBLY CONSISTING OF A BACKREST AND AN AIRBAG MODULE

TECHNICAL FIELD

The invention relates to an assembly consisting of a backrest and an airbag module.

BACKGROUND OF THE INVENTION

The backrest is part of a vehicle seat and comprises a frame, a padding and a covering part. The airbag module comprises an ejection channel that is attached to the frame and serves to provide a restraining effect for a vehicle occupant, especially in case of a side impact. For this purpose, an airbag folded in the airbag module is filled with compressed gas so that it unfolds at the side of the backrest between the upper torso and, if necessary, the head of the vehicle occupant on the one hand, and the door or side structure of the vehicle on the other hand.

An advantage of installing the airbag module in the backrest is that it is always fundamentally in the same position with respect to the upper torso of the vehicle occupant, regardless of whether a very tall occupant is sitting there with the seat slid all the way back or whether a very short vehicle occupant slides the vehicle seat very close toward the steering wheel or the dashboard. The disadvantage of installing the airbag module in the backrest is, of course, that the airbag module has to be accommodated in such a way that it is relatively well protected so as to prevent damage, for example, due to a load being transported in the vehicle, yet in such a way that the unfolding airbag is able to come out of the backrest without any problem. There are numerous concepts in the state of the art for purposes of fulfilling these intrinsically contradictory requirements.

DE-A-196 81 575 describes an assembly of the type mentioned above in which the airbag module is attached to the covering part of the backrest. The area of the covering part that lies against the padding is configured as a swiveling flap that swings open towards the outside, that is to say, towards the side structure of the vehicle, when the gas generator of the airbag module is activated and the airbag unfolds, so that a gap is formed between the padding and the covering part through which the airbag can emerge.

EP-A-0 776 793 describes a vehicle seat in which the airbag module is installed in a separate housing at the side in the backrest. The housing is provided with a covering flap that, when the gas generator is activated, can be pushed towards the outside by the unfolding airbag so that a gap is formed through which the airbag unfolds.

Moreover, solutions are known in which the padding of the backrest is closed by a tear-off seam that is located in the area of what will later be the gap for the deployment of the airbag and that is destroyed by the unfolding airbag.

The drawback of all of these known solutions is, first of all, that the structure of the backrest is relatively complicated and secondly that, due to the expensive design, a large number of parameters influence the unfolding of the airbag so that the unfolding process is not reliably reproducible.

BRIEF SUMMARY OF THE INVENTION

The object of the invention is to improve an assembly of the type described above in such a way that an especially simple structure is achieved, which allows a reliable, consistently reproducible unfolding of the airbag.

This is achieved in an assembly consisting of a backrest and an airbag module, the backrest having a frame, a padding and a covering part. The airbag module has an ejection channel that is attached to the frame. The covering part is designed so as to be rigid whereas the padding in an area of transition to the covering part is configured so as to be so pliant that by deformation of the padding a gap is produced between the covering part and the padding, for the airbag to come out of the backrest. There are a number of advantages to this construction. For one thing, the structure of the backrest is especially simple. No special measures have to be taken to close off the gap through which the airbag emerges when it is activated, since this gap is closed by the intrinsic elasticity of the padding. Moreover, the covering part is not a component of the airbag module, so no special requirements have to be met in terms of the material properties, the design, etc. Finally, a precisely reproducible unfolding behavior is achieved since the only parameter that influences the gap for the unfolding airbag is the flexibility of the padding. The resistance that the padding offers to the unfolding airbag, however, is relatively low in any case, so that changes in the elasticity of the padding have a negligible effect on the unfolding process.

According to a preferred embodiment of the invention, it is provided that the gap is formed between the padding and the covering part in the side area of the backrest and that the ejection channel is configured so as to be curved, it extending starting from a rear side of the frame facing away from the padding toward the side area. By arranging part of the airbag module on the rear side of the backrest, the gap through which the airbag emerges can be arranged relatively close to the backrest. Due to the resultant greater distance between the outlet opening of the gas generator and the thorax region of a vehicle occupant, the airbag is rendered more suitable for restraining events in which the vehicle occupant is not seated in the position that was assumed and for which the airbag module was designed. Moreover, better sitting comfort is ensured in the lateral support region of the backrest. Furthermore, by guiding the airbag in the ejection channel, the airbag is deployed more uniformly through the gap between the padding and the covering part. The uniform deployment of the airbag through the gap is further enhanced in that the compressed gas supplied by the gas generator is thoroughly distributed as a result of the relatively large distance between the area of the airbag module into which the compressed gas flows and the gap between the padding and the covering part. Finally, the ejection channel serves as a guide for the airbag so as to prevent jamming of the airbag when it is coming out of the gap between the padding and the covering part, even if components of the vehicle intrude in this process.

Preferably, it is provided that the padding has a slanted surface lying opposite the airbag module. The slanted surface helps the padding to recede when the gas generator is activated and the airbag is unfolded, and guides the airbag out of the backrest.

According to the preferred embodiment, it is provided that the airbag module has a gas lance that constitutes the connection to a gas generator. In this manner, the gas generator can be arranged flexibly in the backrest so that, through the spatial separation of the gas generator and the ejection channel, the possibility arises to stow the airbag very compactly and to design the airbag module correspondingly compactly. Thus, they can also be used in narrow vehicles or in vehicles with a bulky side structure.

The ejection channel of the gas bag module may be formed by a housing which preferably consists of plastics and is configured in two pieces. On the side facing the outside of the seat, the housing consists of a covering and on the side facing the inside of the seat it consists of a holding part. Provision may be made that sections of the housing are moved in the nature of a flap, for opening an outlet for the emergence of the airbag.

Advantageous embodiments of the invention will be apparent from the subordinate claims.

DETAILED DESCRIPTION OF THE PREFERRED EMBODIMENT

Figure 1:
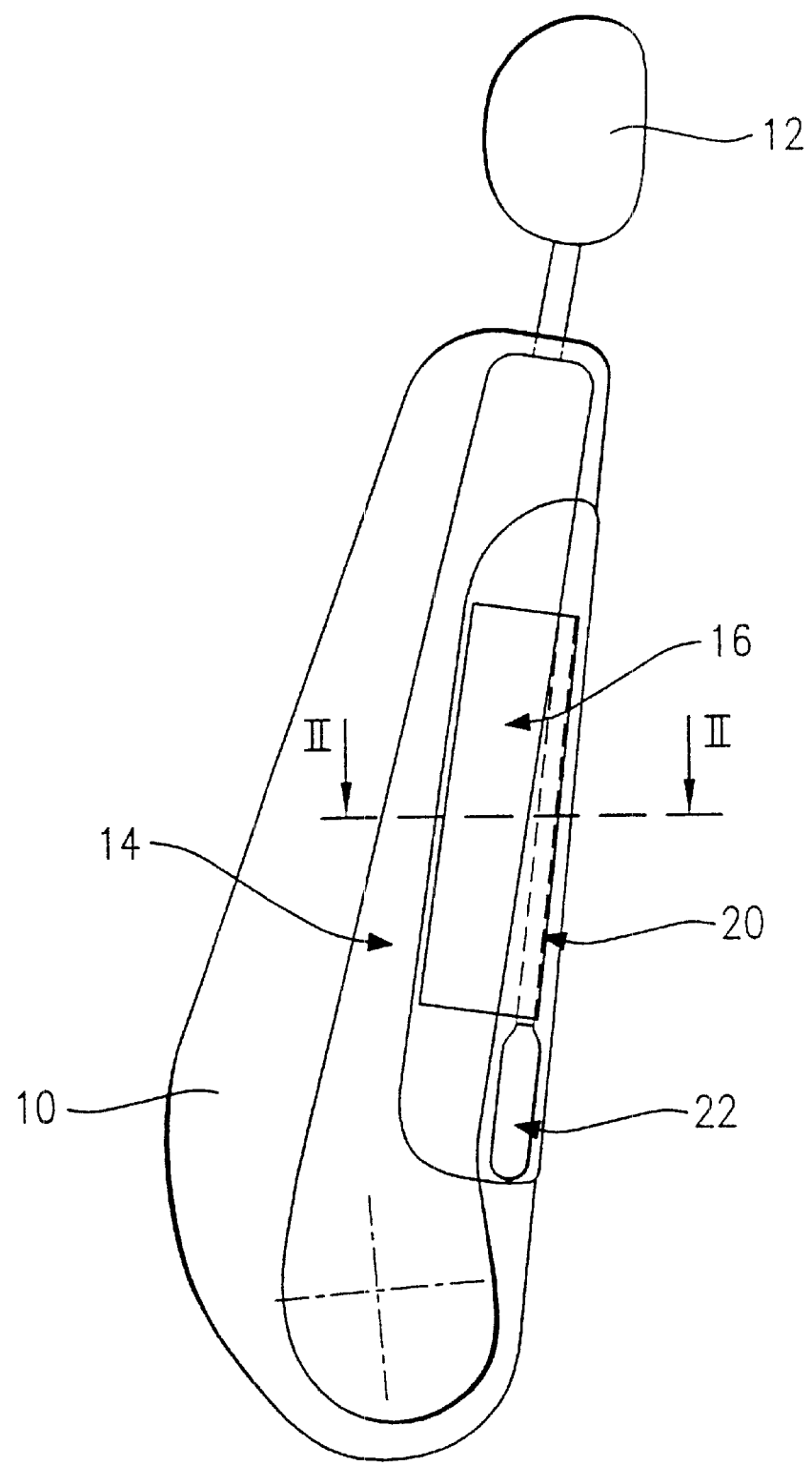
FIG. 1 shows in a schematic side view an assembly according to the invention.

FIG. 1 shows a backrest 10 that is fitted with a headrest 12 and that is designed to be affixed to the seat area of a vehicle seat. In the backrest 10, there is arranged an airbag module 14 that consists of an ejection channel 16, of an airbag 18 arranged in the ejection channel (also see FIG. 2), of a gas lance 20 extending into the ejection channel 16 and of a gas generator 22.

Figure 2:
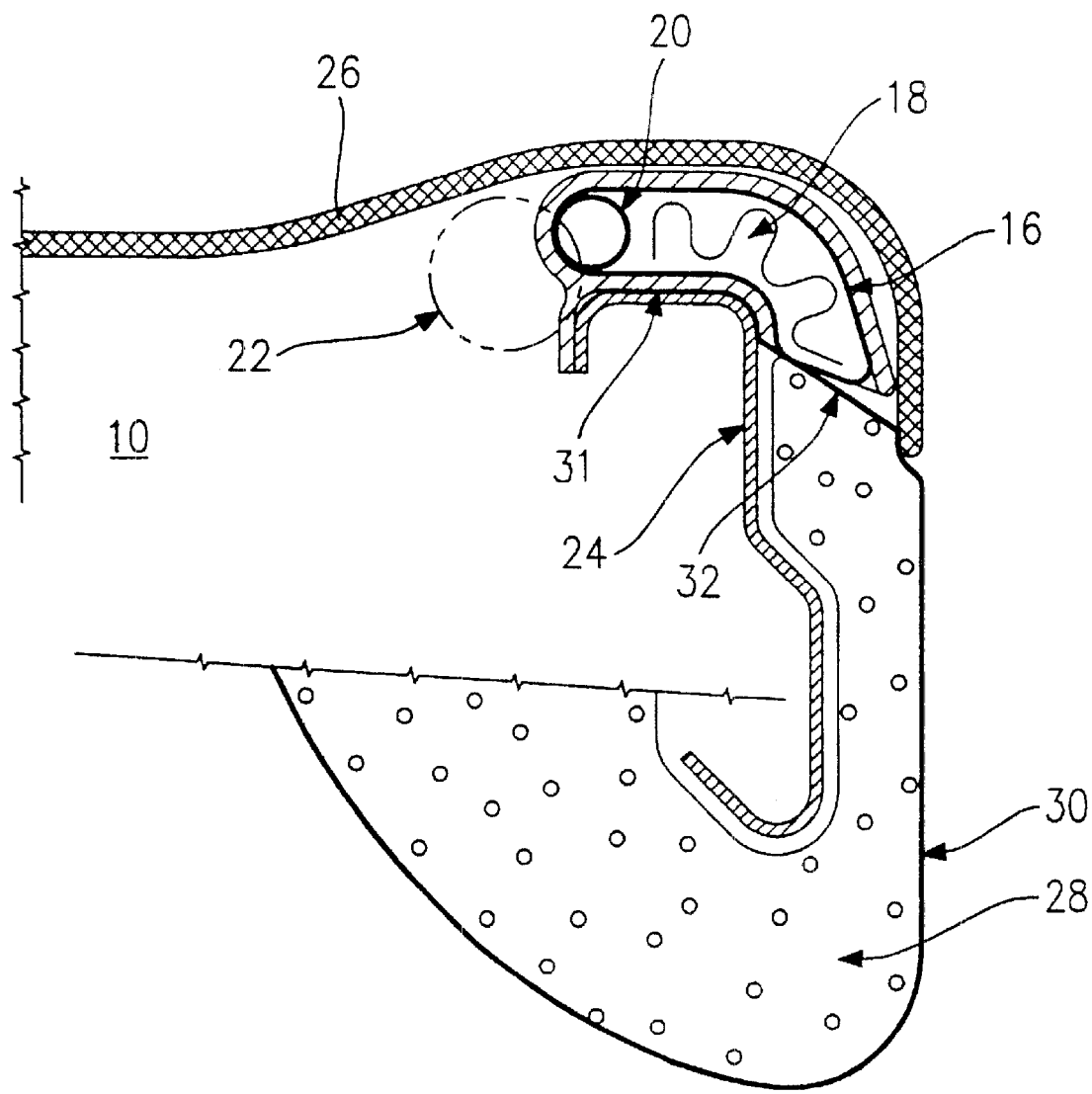
FIG. 2 shows schematically a section along the plane II—II of FIG. 1 with the airbag module in the non-activated state.
Figure 3:
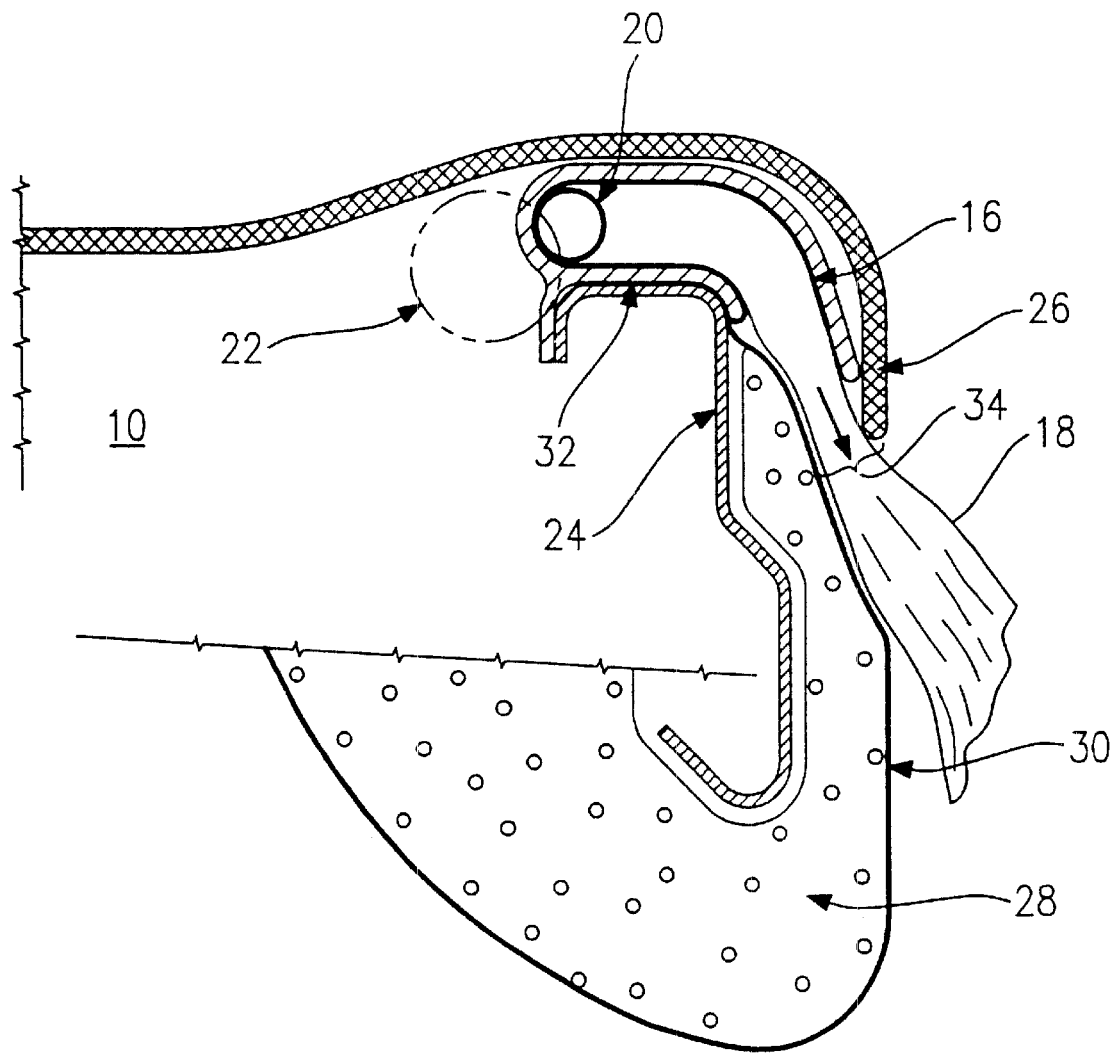
FIG. 3 shows a view corresponding to that of FIG. 2 with the airbag unfolded.

As can be seen in FIG. 2, the backrest 10 has a frame 24 having an area—located at the top in FIG. 2—facing the rear side of the backrest as well as a side area that is located on the right-hand side in FIG. 2. On the rear side of the backrest, there is a covering part 26 made of an inherently stable plastic material extending from the rear side as far as to the outside of the lateral support of the backrest. On the frame 24, there is provided a padding 28 that extends around the frame 24 on the outside of the backrest all the way to the covering part 26. The padding 28 is covered by a fabric 30 that lies against the covering part 26 and that then extends into the inside of the backrest where it is attached to the frame 24 in the rear area.

This area of the frame 24 is also where the ejection channel 16 of the airbag module is located. As can be seen in FIG. 2, the ejection channel consists of a first section 31 in which the gas lance 20 and part of the airbag 18 are located, and which extends approximately in the plane of the rear side of the backrest. Adjacent to the first section, there is a curved section which is, in turn, followed by a straight section towards the padding 28. Opposite the ejection channel 16 the padding 28 is formed with a slanted surface 32 over which the fabric 30 runs from the covering part 26 to the frame 24.

The ejection channel 16, like the covering part 26, is made of an inherently stable material. The term "inherently stable" is understood to mean that the covering part as well as the ejection channel do not undergo any major shape changes when the gas generator is activated and when the airbag unfolds, that is to say, apart from a negligible flexing due to the intrinsic elasticity of the material, they are not bent or deflected by the forces exerted.

As can be seen in FIG. 2, the airbag module is not accessible from the outside frame of the backrest, since the padding 28—as a result of its intrinsic elasticity—lies against the covering part 26. Due to the elasticity of the padding 28, however, when the gas generator 22 is activated, the airbag 18 that is filled by the compressed gas then generated can compress the padding 28, starting with the slanted surface 32 and progressing towards the frame 24, so that a gap 34 is formed between the padding and the fabric 30 on the one hand and the covering part 26 on the other hand. Through this gap 34, the airbag 18, additionally guided by the ejection channel 16, by the fabric 30 and by the covering part 26, can unfold at the side of the backrest.

What is claimed is:

1. An assembly consisting of a backrest and an air bag module, said backrest having a frame, a padding and a covering part, and said air bag module having an air bag and an ejection channel that is attached to said frame, said padding lying against said covering part, said covering part being designed so as to be rigid whereas said padding in an area of transition to said covering part is configured so as to be so pliant that by deformation of said padding a gap is produced between said covering part and said padding upon activation of said gas generator, for said air bag to come out of said backrest.

2. The assembly according to claim 1, wherein said gap is formed between said padding and said covering part in a side area of said backrest.

3. The assembly according to claim 2, wherein said ejection channel is configured so as to be curved, it extending starting from a rear side of said frame facing away from said padding toward said side area.

4. The assembly according to claim 1, wherein said padding has a slanted surface lying opposite said airbag module.

5. The assembly according to claim 1, wherein said airbag module has a gas lance that constitutes a connection to a gas generator.

6. The assembly according to claim 1, wherein the covering part is not bent or deflected by the air bag upon inflation.

7. An assembly consisting of a backrest and an air bag module, said backrest having a frame, a padding and a covering part, and said air bag module including an inflatable air bag and an ejection channel that is attached to said frame through which said air bag inflates, said padding lying against said covering part, said covering part covering said air bag module and being rigid whereas said padding in an area of transition to said covering part is pliant, said air bag on inflation deforming said padding to produce a gap between said covering part and said padding upon activation of said gas generator, for said air bag to come out of said backrest.

8. The assembly according to claim 7, wherein the covering part is not bent or deflected by the air bag upon inflation.

* * * * *